US012420572B2

(12) United States Patent
Doyo

(10) Patent No.: US 12,420,572 B2
(45) Date of Patent: Sep. 23, 2025

(54) CONTACT PRESSURE ADJUSTMENT METHOD AND IMAGE RECORDING APPARATUS

(71) Applicant: KYOCERA Document Solutions Inc., Osaka (JP)

(72) Inventor: Hideaki Doyo, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 188 days.

(21) Appl. No.: 18/373,846

(22) Filed: Sep. 27, 2023

(65) Prior Publication Data

US 2024/0109343 A1 Apr. 4, 2024

(30) Foreign Application Priority Data

Oct. 4, 2022 (JP) ................................ 2022-159996

(51) Int. Cl.
*B41J 11/42* (2006.01)
*B41J 11/46* (2006.01)

(52) U.S. Cl.
CPC ................ *B41J 11/42* (2013.01); *B41J 11/46* (2013.01)

(58) Field of Classification Search
CPC .................................. B41J 11/42; B41J 11/46
See application file for complete search history.

(56) References Cited

FOREIGN PATENT DOCUMENTS

| | | | |
|---|---|---|---|
| JP | 2008302513 A | 12/2008 | |
| JP | 2011184163 A | 9/2011 | |
| JP | 4944308 B2 * | 5/2012 | ............ G03G 15/65 |

* cited by examiner

*Primary Examiner* — Justin Seo
(74) *Attorney, Agent, or Firm* — Alleman Hall & Tuttle LLP

(57) ABSTRACT

The technology according to the present disclosure is a contact pressure adjustment method capable of suppressing adhesion of ink to a roller surface of a roller that conveys a sheet on which an image has been recorded, in an image recording apparatus. The contact pressure adjustment method includes: causing an image recording portion of an image recording apparatus to record a predetermined test image on a sheet; causing a vibration detection portion to detect vibration generated in the test image recorded sheet on which the test image is recorded while the test image recorded sheet is being conveyed along a conveying path; and in a case where a fluctuation width of the vibration detected by the vibration detection portion is outside a predetermined reference range, adjusting contact pressure of a driven roller against the image recording surface of the test image recorded sheet.

10 Claims, 11 Drawing Sheets

CONTACT PRESSURE ADJUSTMENT METHOD AND IMAGE RECORDING APPARATUS

INCORPORATION BY REFERENCE

This application is based upon and claims the benefit of priority from the corresponding Japanese Patent Application No. 2022-159996 filed on Oct. 4, 2022, the entire contents of which are incorporated herein by reference.

The present disclosure relates to an image recording apparatus that records an image on a sheet.

BACKGROUND

Conventionally, an inkjet recording apparatus having a so-called line head type recording head is known. The recording head has ink nozzles over an entire width of the sheet, and records an ink image on the sheet without scanning in the width direction.

The inkjet recording apparatus requires a higher speed for image recording than a so-called serial printer that scans in the width direction of the sheet. Therefore, a dryer for drying ink on a recording surface of the sheet is provided at a downstream side of the recording head. However, even in a case where a dryer is provided, there are cases where the sheet is conveyed on a conveying path in a state where only the surface of the ink image is dried and the inside of the ink image is not dried. In this case, there is a problem in that when the sheet is conveyed by a conveying roller pair, ink is adhered to a roller surface due to contact pressure applied to the sheet, the ink is then transferred to the next conveyed sheet, and an image is recorded on the sheet, resulting in a deterioration of image quality.

With an object of solving the problem described above, configurations are known such as a configuration in which a surface of a driven roller in contact with the recording surface is provided with multiple point contact portions, or a configuration in which the driven roller of the conveying roller pair is moved to a position where the amount of ink adhering to the sheet is small.

SUMMARY

The contact pressure adjustment method according to one aspect of the present disclosure is a contact pressure adjustment method applied to an image recording apparatus that records an image on a sheet.

The image recording apparatus, includes: an image recording portion; a drive roller configured to convey the sheet along a predetermined conveying path by coming in contact with the sheet on which an image is recorded by the image recording portion and applying a conveying force to the sheet; a driven roller arranged at a position facing the drive roller and configured to be driven and rotated in contact with the image recording surface of the sheet with a predetermined contact pressure; and a vibration detection portion configured to detect vibration generated in the sheet conveyed on the conveying path.

The contact pressure adjustment method is a contact pressure adjustment method that includes: causing the image recording portion to record a predetermined test image on the sheet; causing the vibration detection portion to detect vibration generated in a test image recorded sheet on which the test image is recorded while the test image recorded sheet is being conveyed along the conveying path; and adjusting the contact pressure with respect to the image recording surface of the test image recorded sheet in a case where a fluctuation width of the vibration detected by the vibration detection portion is outside a predetermined reference range.

The image recording apparatus according to another aspect of the present disclosure includes: an image recording portion configured to record an image on a sheet; a drive roller configured to convey an image recorded sheet on which an image has been recorded by the image recording portion along a predetermined conveying path by coming in contact with and applying a conveying force to the image recorded sheet; a driven roller arranged at a position facing the drive roller and configured to be driven and rotated in contact with an image recording surface of the image recorded sheet with a predetermined contact pressure; a vibration detection portion configured to detect vibration generated in the image recorded sheet conveyed along the conveying path; and an output processing portion configured to output a fluctuation width of the vibration detected by the vibration detection portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments according to the present disclosure will be described with reference to the drawings. It should be noted that the embodiments described below are merely examples that embody the technique according to the present disclosure, and do not limit the technical scope described in the present disclosure.

First Embodiment

Figure 1:
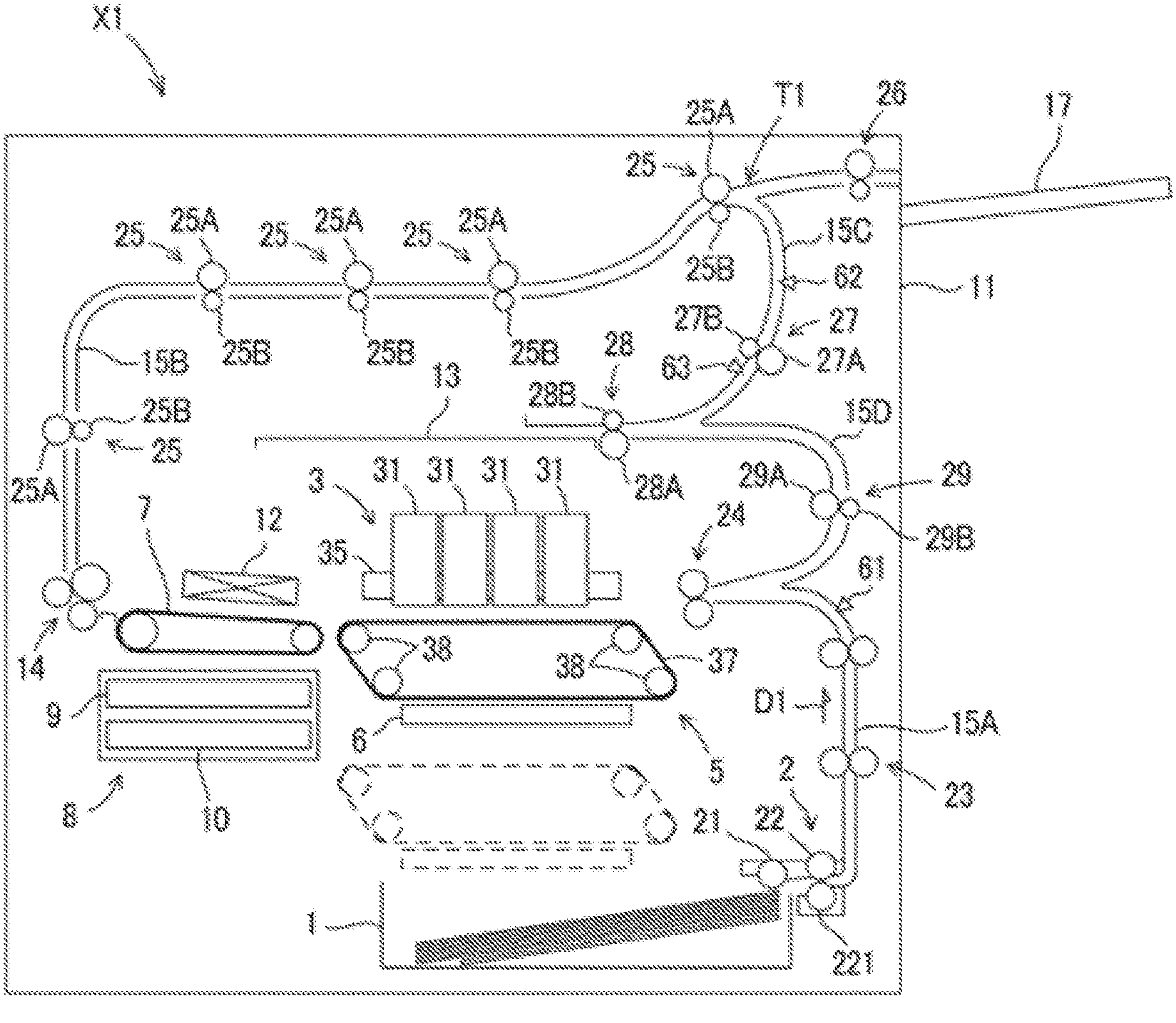
FIG. 1 is a schematic diagram showing a configuration of an inkjet recording apparatus of a first embodiment according to the present disclosure.

An inkjet recording apparatus X1 (hereinafter abbreviated as "recording apparatus X1") of a first embodiment according to the present disclosure will be described with reference to FIG. 1. Note that FIG. 1 shows a state in which a first conveying unit 5 of the recording apparatus X1 is arranged at a recording position where printing by a recording portion 3 is possible. In addition, in FIG. 1, the first conveying unit 5 is indicated by a dashed line in a case where the first conveying unit 5 is arranged at a retreat position spaced a predetermined distance below the recording position.

As shown in FIG. 1, the recording apparatus X1 is an example of an image recording apparatus according to the present disclosure, and records an image on a sheet based on an inkjet recording method. The recording apparatus X1 includes a sheet feed cassette 1, a sheet feed portion 2, a recording portion 3 (an example of an image recording portion according to the present disclosure), a first conveying unit 5, an elevating mechanism 6, a second conveying unit 7, a drying fan 12, a decurler portion 14, a maintenance unit 8, a sheet discharge tray 17, an operation panel 40 (see FIG. 5), a control portion 90 (see FIG. 5), and a housing 11 that accommodates or supports these components.

In addition, four conveying paths 15 (15A, 15B, 15C, 15D) are provided inside of the housing 11. The first conveying path 15A guides a sheet from the sheet feed cassette 1 to the recording portion 3, and the second conveying path 15B guides the sheet from the second conveying unit 7 to the sheet discharge tray 17. A third conveying path 15C (an example of a curved conveying path according to the present disclosure) branches from a branch point T1 in a middle of the second conveying path 15B and guides the sheet to an intermediate tray 13 for switchback, and is also generally called a switchback conveying path. A fourth conveying path 15D guides the sheet on which an image has been recorded from the intermediate tray 13 to the recording portion 3.

In addition, the conveying path 15 also includes a stiffness sensor 61 for detecting the stiffness of the sheet, a leading edge detection sensor 62 for detecting the leading edge of the sheet, and a vibration sensor 63 (an example of a vibration detection portion) according to the present disclosure) for detecting vibration generated in the sheet being conveyed.

The recording apparatus X1 is a printer that executes a printing process based on input image data. Note that the image recording apparatus according to the present disclosure is applicable not only to printers that record images on sheets based on an inkjet recording method, but also to copiers, facsimile machines, multifunction peripherals, and the like.

The sheet feed cassette 1 is provided at a bottom portion of the housing 11. The sheet feed cassette 1 accommodates sheets to be printed in the recording apparatus X1. Of course, a sheet is a sheet-shaped recording medium, for example, a so-called printing paper. Of course, the sheet is not limited to printing paper, and may be a recording medium such as an OHP sheet or cloth.

A sheet feed portion 2 is a feeding mechanism including a pickup roller 21 and a feeding roller 22. A retard roller 221 is provided at a position facing the feeding roller 22. A pickup roller 21 picks up sheets one by one from the sheet feed cassette 1. The feeding roller 22 feeds the sheet picked up by the pickup roller 21 to the first conveying path 15A.

A conveying roller pair 23 for conveying the sheet is provided at an appropriate position on the first conveying path 15A. The conveying roller pair 23 includes a drive roller and a driven roller that are pressed against each other. The conveying roller pair 23 conveys the sheet fed to the first conveying path 15A toward a registration roller pair 24.

The registration roller pair 24 is provided in front of the recording portion 3. The registration roller pair 24 includes a drive roller and a driven roller that are pressed against each other. The registration roller pair 24 conveys the sheet to the recording portion 3 at a predetermined conveying timing (timing of writing an image).

The first conveying unit 5 and the recording portion 3 are arranged on the downstream side of the registration roller pair 24 in a conveying direction D1.

The recording portion 3 has a plurality of line heads 31 corresponding to black, cyan, magenta, and yellow, and a head frame 35 that supports the line heads 31. The head frame 35 is supported by the housing 11. In the present embodiment, the recording portion 3 has four line heads 31 corresponding to the four colors described above. Note that the number of line heads 31 is not limited to four, as long as at least one line head is provided.

The line head 31 is a so-called line head type recording head. That is, the recording apparatus X1 is a so-called line head type inkjet recording apparatus. The line head 31 is elongated in a width direction perpendicular to the sheet conveying direction D1 (direction perpendicular to the sheet surface of FIG. 1), and more particularly, a width of the line head 31 has a length corresponding to a width of the maximum sheet width to be conveyed. In other words, the line head 31 has a plurality of ink nozzles capable of ejecting ink over the entire width of the sheet. Therefore, the line head 31 is able to record an ink image on the sheet without scanning in the width direction.

Each line head 31 is separated by a predetermined interval along the sheet conveying direction D1. A lower surface of the line head 31 is an ink ejection surface. The ink ejection surface is provided with a large number of ink nozzles for ejecting ink.

The recording portion 3 records an image on the sheet conveyed by the first conveying unit 5. The recording portion 3 records an image on the sheet by ejecting ink from the ink nozzles of each line head 31. As an ink ejection method of the line head 31, for example, a piezo method in which ink is ejected using a piezo element, or a thermal method in which ink is ejected by generating air bubbles by heating, or the like is adopted.

The recording apparatus X1 includes ink tanks (not shown) containing inks corresponding to the respective colors of black, cyan, magenta, and yellow. The ink tanks are connected to the line heads 31 by ink tubes (not shown). Each line head 31 is supplied with ink from the corresponding ink tank through the ink tube.

The first conveying unit 5 is arranged below the recording portion 3. The first conveying unit 5 conveys the sheet in the conveying direction D1 while facing the ink ejection surface of the line head 31. More specifically, the first conveying unit 5 includes a sheet conveying belt 37 on which a sheet is placed, a tension roller 38 that stretches the sheet conveying belt 37, and a unit frame (not shown) that supports the sheet conveying belt 37 and the tension roller 38.

A gap between the sheet conveying belt 37 and the ink ejection surface is adjusted so that a gap between the surface of the sheet and the ink ejection surface during image recording is, for example, 1 mm.

When the tension roller 38 is rotated by a driving force transmitted from a drive portion such as a motor, the sheet conveying belt 37 rotates. Thus, the first conveying unit 5 is able to convey the sheet in the conveying direction D1. After the sheet supplied from the sheet feed portion 2 reaches the first conveying unit 5, the sheet is then conveyed by the first conveying unit 5 toward the second conveying unit 7 via the recording portion 3. Note that the first conveying unit 5 may include a suction unit (not shown) that sucks air from a large number of through holes formed in the sheet conveying belt 37 so that the sheet is sucked and adhered to the sheet conveying belt 37.

The elevating mechanism 6 is provided below the first conveying unit 5. The elevating mechanism 6 supports the first transport unit 5 from below and causes the first conveying unit 5 to move up or down with respect to the line head 31. That is, the elevating mechanism 6, by causing the first conveying unit 5 to move up or down, causes the first conveying unit 5 and the line head 31 to move closer together or separated from each other. More specifically, the elevating mechanism 6 causes the first conveying unit 5 to move between a recording position where printing by the recording portion 3 is possible (position indicated by a solid line in FIG. 1), and a retreat position at a predetermined distance downward from the recording position (position indicated by a dashed line in FIG. 1).

The retreat position is the lowest position of the first conveying unit 5 in the up-down direction and the position where the first conveying unit 5 is separated the most from the line head 31. When the first conveying unit 5 is at the retreat position, the sheet remaining on the first conveying unit 5 can be removed. In addition, when the first conveying unit 5 is at the retreat position, the maintenance unit 8 can be moved to an empty space below the recording portion 3.

The maintenance unit 8 is arranged at a predetermined standby position (position shown in FIG. 1) during non-printing. The standby position is a position set below the second conveying unit 7 farther on the downstream side in the conveying direction D1 than the recording portion 3. The maintenance unit 8 is a mechanism for maintaining or recovering the ejection performance of the line head 31 and has a cap unit 9 and a wiping unit 10. In a state where the maintenance unit 8 is arranged in the space at the lower side of the recording portion 3, a capping operation for covering the ink nozzles on the ink ejection surface by the cap unit 9 and a wiping operation by the wiping unit 10 are enabled.

As shown in FIG. 1, the second conveying unit 7 is provided on the downstream side in the conveying direction D1 of the recording portion 3. The second conveying unit 7 includes a sheet conveying belt on which a sheet is placed, a pair of tension rollers for stretching the sheet conveying belt, and a frame that supports the sheet conveying belt and the tension rollers. The sheet on which the ink image is recorded by the recording portion 3 is conveyed to the second conveying unit 7.

A drying fan 12 is provided above the second conveying unit 7. The drying fan 12 is a fan for blowing air toward an image recording surface of the sheet on the sheet conveying belt. By the drying fan 12 blowing air while the sheet is conveyed on the sheet conveying belt of the second conveying unit 7, drying of the ink adhering to the image recording surface of the sheet is accelerated.

Even when the drying fan 12 (dryer) is provided, the sheet may be conveyed on the conveying path in a state where only the surface of the ink image is dried and the inside of the ink image is not dried. In this case, there is a problem in that when the sheet is conveyed by a conveying roller pair, ink is adhered to a roller surface due to contact pressure applied to the sheet, the ink is then transferred to the next conveyed sheet, and an image is recorded on the sheet, resulting in a deterioration of image quality.

Configurations for solving the above-described problems, such as a configuration in which the surface of the driven roller, which contacts the recording surface of the sheet, is provided with multiple point contact portions, or a configuration in which the driven roller of the conveying roller pair is moved to a position where the amount of ink adhering to the sheet is small, are known.

However, in a case where the driven roller makes point contact with the recording surface of the sheet, the contact pressure at the point contact portion increases, and there is a risk that undried ink may adhere to the contact portion. In addition, in a case where an image with a large amount of ink is printed on an entire recording surface of the sheet, there are no locations where the amount of ink is low on the recording surface of the sheet, and ink adheres to the roller surface no matter where the driven roller is moved.

According to the present embodiment, in the image recording apparatus X1, it is possible to suppress ink from adhering to the roller surface of the roller that conveys the sheet on which the image has been recorded.

A decurler portion 14 is provided farther on the downstream side than the second conveying unit 7 in the conveying direction D1. The sheet is conveyed from the second conveying unit 7 to the decurler portion 14 and further conveyed to the second conveying path 15B. The decurler portion 14 has a plurality of rollers arranged in the width direction of the sheet. When the sheet passes through the decurler portion 14, curling that has occurred in the sheet is corrected by the decurler portion 14.

The sheet that has passed through the decurler portion 14 is further conveyed to the downstream side in the conveying direction by a plurality of conveying roller pairs 25 provided along the second conveying path 15B. Each conveying roller pair 25 includes a drive roller 25A and a driven roller 25B that are pressed against each other. During conveying by the conveying roller pair 25, the drive roller 25A comes in contact with a non-image recording surface, and the driven roller 25B comes in contact with the image recording surface.

A second conveying path 15B extends upward along a left side surface of the housing 11 in FIG. 1, bends to the right side, extends toward a right side surface of the housing 11, further extends obliquely upward, and reaches the sheet discharge tray 17 via the branch point T1.

In a case where double-sided recording is not performed on the sheet, the sheet is conveyed to the exit (discharge port) of the second conveying path 15B, and is discharged to the sheet discharge tray 17 by a conveying roller pair 26 for discharge provided near the discharge port.

An intermediate tray 13 is provided above the housing 11 and between the recording portion 3 and the second conveying path 15B. The intermediate tray 13 is a sheet supporting portion that temporarily retracts the sheet when a switchback operation for reversing the front and back of the sheet is performed.

In a case where double-sided recording is performed on a sheet, the sheet on which an image is recorded on the first surface (image recording surface) is conveyed to a third conveying path 15C branching downward from the branch point T1 in the middle of the second conveying path 15B. For example, the branch point T1 is provided with a flap for changing the sheet conveying direction, and the sheet conveying direction is changed by the flap displacing upon receiving a driving force of a solenoid or a motor.

The third conveying path 15C is a curved conveying path formed in a curved shape. The third conveying path 15C extends downward from the branch point T1, curves to the left side while making a gentle curve, and reaches the intermediate tray 13.

When the sheet is fed to the third conveying path 15C branching from the second conveying path 15B, the sheet is further conveyed toward the downstream side in the conveying direction by a conveying roller pair 27 provided in the third conveying path 15C. The conveying roller pair 27 includes a drive roller 27A and a driven roller 27B that are pressed against each other. During conveying by the conveying roller pair 27, the drive roller 27A comes in contact with the non-image recording surface, and the driven roller 27B comes in contact with the image recording surface.

A conveying roller pair 28 is provided near an entrance of the intermediate tray 13. The conveying roller pair 28 includes a drive roller 28A and a driven roller 28B that are pressed against each other. During conveying by the conveying roller pair 28, the drive roller 28A comes in contact with the non-image recording surface, and the driven roller 28B comes in contact with the image recording surface. The conveying roller pair 28 conveys the sheet from the third conveying path 15C to the intermediate tray 13, then pauses the operation of the conveying roller pair 28, and next reverses the rotating direction of the drive roller 29A. Thus, it is possible to reverse the front and back of the sheet, and the sheet on the intermediate tray 13 may be conveyed to the fourth conveying path 15D.

The fourth conveying path 15D extends from the intermediate tray 13 toward the right side, bends downward, bends toward the left side about 180 degrees, and reaches the registration roller pair 24.

A conveying roller pair 29 is provided in the fourth conveying path 15D. The conveying roller pair 29 includes a drive roller 29A and a driven roller 29B that are pressed against each other. During conveying by the conveying roller pair 29, the drive roller 29A comes in contact with the non-image recording surface, and the driven roller 29B comes in contact with the image recording surface. When the reversed sheet is sent to the fourth conveying path 15D, the sheet is further conveyed toward the downstream side in the conveying direction by the conveying roller pair 29 and reaches the registration roller pair 24. The reversed sheet is conveyed to the first conveying unit 5 again with the second surface on which no image is recorded facing upward. Thus, an ink image is recorded on the second surface by the recording portion 3.

The conveying roller pairs 25, 27, 28, and 29 that nip and convey the sheet having the image recorded on the first surface convey the sheet by a frictional force generated between a roller surface and the sheet. That is, a force in the conveying direction is applied from the roller surface to the sheet by the frictional force, and the sheet is conveyed in the conveying direction. As described above, the conveying roller pairs 25, 27, 28, and 29 are composed of a drive roller that rotates and drives and comes in contact with the non-image recording surface (first surface) of the sheet, and a driven roller that is driven and comes in contact with the image recording surface (second surface) of the sheet. The driven roller is not driven and rotated by receiving a driving force. Therefore, between the roller surface of the driven roller and the image recording surface of the sheet, a so-called stick-slip phenomenon is considered to occur in which two states, a state in which the roller surface and the image recording surface adhere to each other and a static frictional force acts (adhesion state) and a state in which the roller surface and the image recording surface slide and a dynamic frictional force acts (slip state), alternately occur.

In a case where a difference between the static frictional force and the dynamic frictional force is small, a force as strong as the static frictional force is always applied to the roller surface of the driven roller. Therefore, although the sheet can be securely held and conveyed, there is a high possibility that the ink image on the image recording surface will adhere to the roller surface of the driven roller. In this case, a problem may arise in that the ink adhering to the driven roller is retransferred to a following sheet.

On the other hand, in a case where the difference between the static frictional force and the dynamic frictional force is large, that is, in a case where the dynamic frictional force is smaller than a predetermined threshold value with respect to the static frictional force, in the sliding state, pressure contact force (contact pressure, nip pressure) between the roller surface of the driven roller and the sheet is relatively small. Therefore, although ink from the ink image on the image recording surface is less likely to adhere to the roller surface of the driven roller, the driven roller or drive roller may slip, resulting in unstable conveyance of the sheet.

In the present embodiment, when the stick-slip phenomenon occurs between the driven roller and the sheet, by taking notice of a relation in which the greater the fluctuation width of a waveform of vibration generated in the sheet, the greater the difference between the static frictional force and the dynamic frictional force (frictional force difference) becomes, and the smaller the fluctuation width of the waveform of vibration, the smaller the difference between the static friction force and the dynamic friction force (frictional force difference) becomes, and using that relation, it is possible in the recording apparatus X1 to prevent ink from adhering to the roller surface of the driven roller when conveying a sheet on which an image has been recorded. Here, the fluctuation width is the difference between the maximum value and the minimum value of the waveform of the vibration.

Figure 2:
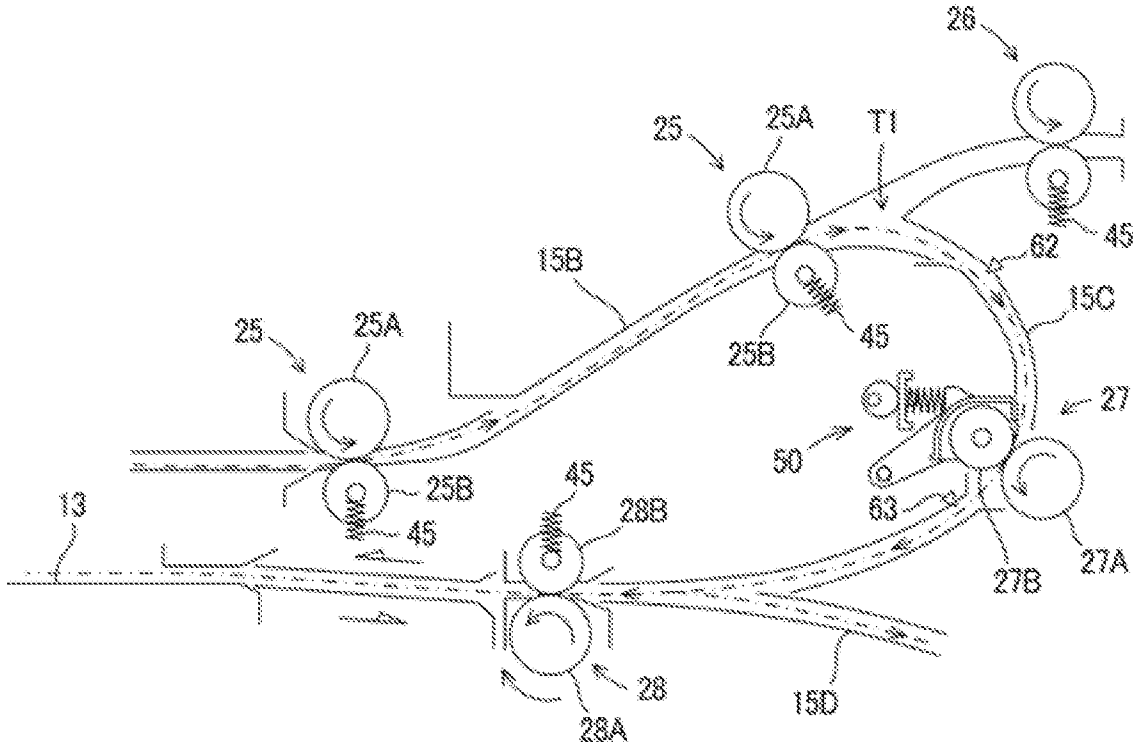
FIG. 2 is a diagram showing a third conveying path within the inkjet recording apparatus of the first embodiment according to the present disclosure.
Figure 3:
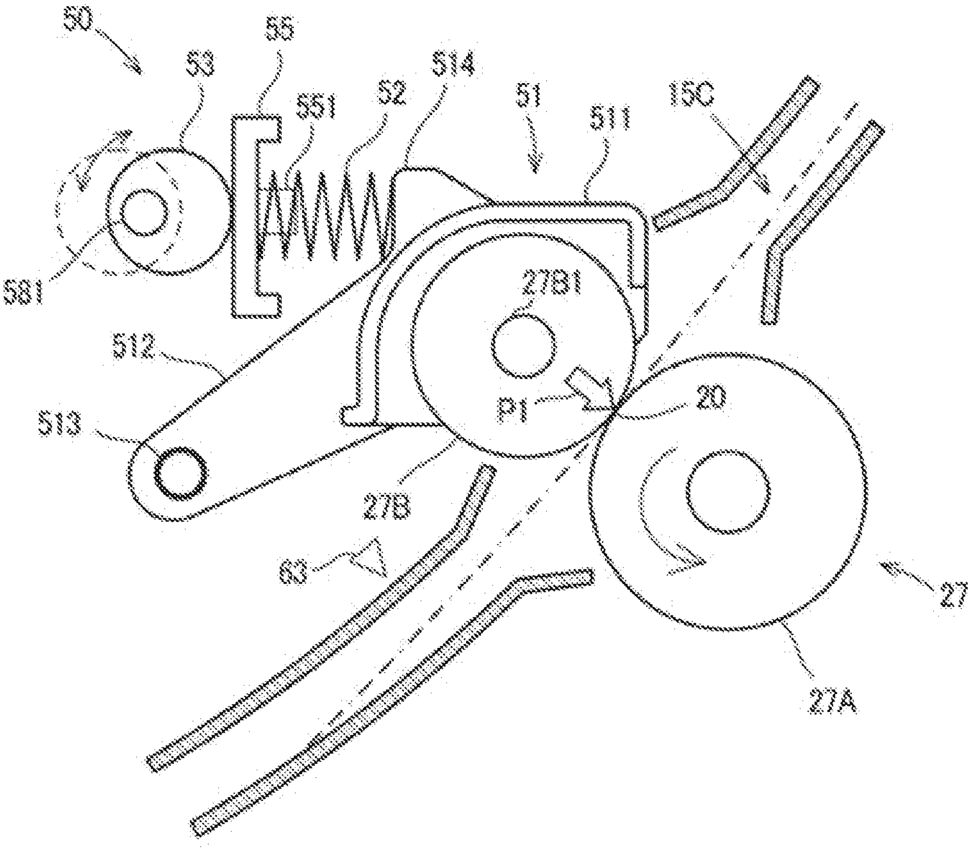
FIG. 3 is a diagram showing a contact pressure adjustment mechanism provided in the third conveying path, and shows a state in which a pressing force on a driven roller is the largest.
Figure 4:
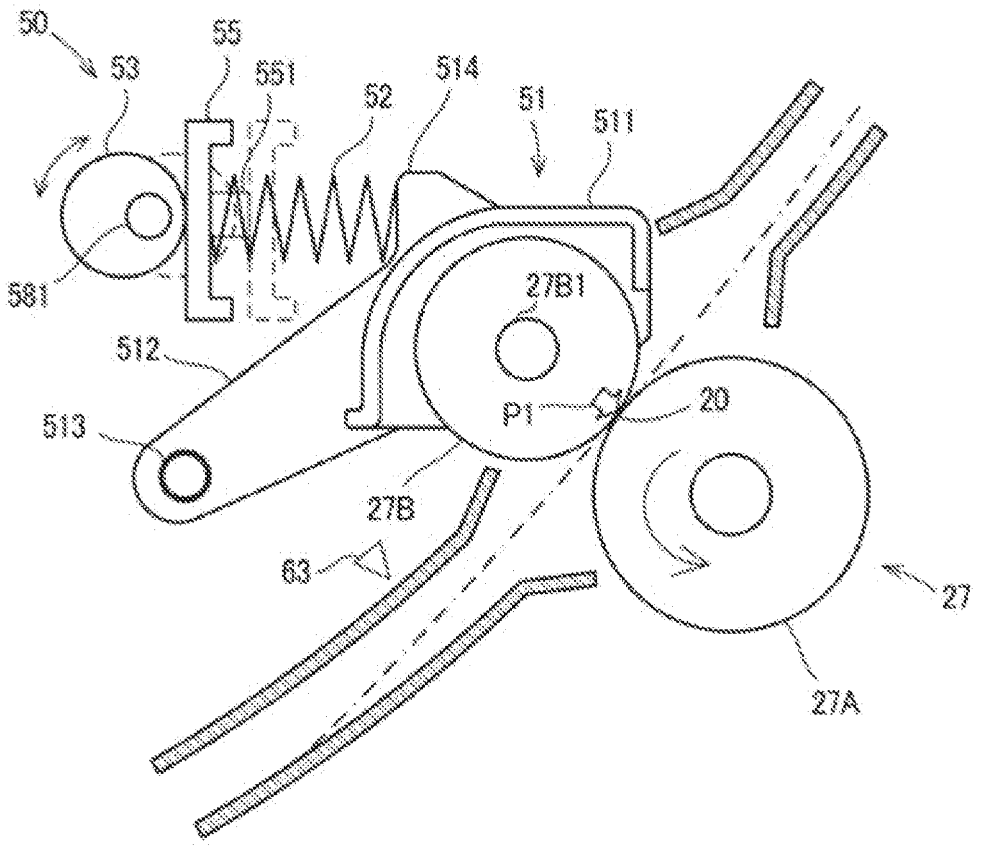
FIG. 4 is a diagram showing the contact pressure adjustment mechanism provided in the third conveying path, and shows a state in which a pressing force on a driven roller is the smallest.

FIG. 2 is a diagram showing part of the second conveying path 15B and the third conveying path 15C. FIG. 3 and FIG. 4 are diagrams showing the contact pressure adjustment mechanism 50 provided in the third conveying path 15C. FIG. 3 shows a state in which the contact pressure P1 (contact pressure, nip pressure) of the driven roller 27B with respect to the drive roller 27A is the largest, and FIG. 4 shows a state in which the contact pressure P1 is the smallest.

As shown in FIG. 2, the driven rollers of the conveying roller pairs 25, 26, 28 are pressed toward the driving rollers by an elastic force of elastic members 45 such as springs. Each driven roller is supported so as to be able to move toward the drive roller. Therefore, the driven roller is pressed against the surface of the drive roller with a predetermined contact pressure due to the elastic force of the elastic member. When the leading edge of the sheet enters a nip portion of each conveying roller pair 25, 26, 28, the sheet is drawn into the nip portion due to the rotation of the drive roller, and the sheet is conveyed toward the downstream side in the conveying direction by frictional force that is generated between both the drive roller and the driven roller and the surface of the sheet.

As shown in FIG. 2, the recording apparatus X1 includes the contact pressure adjustment mechanism 50 (an example of the contact pressure adjustment portion according to the present disclosure). The contact pressure adjustment mechanism 50 is configured to be able to adjust the contact pressure P1 of the driven roller 27B (an example of a driven roller according to the present disclosure) against the drive roller 27A (an example of a drive roller according to the present disclosure) of the conveying roller pair 27.

Figure 5:
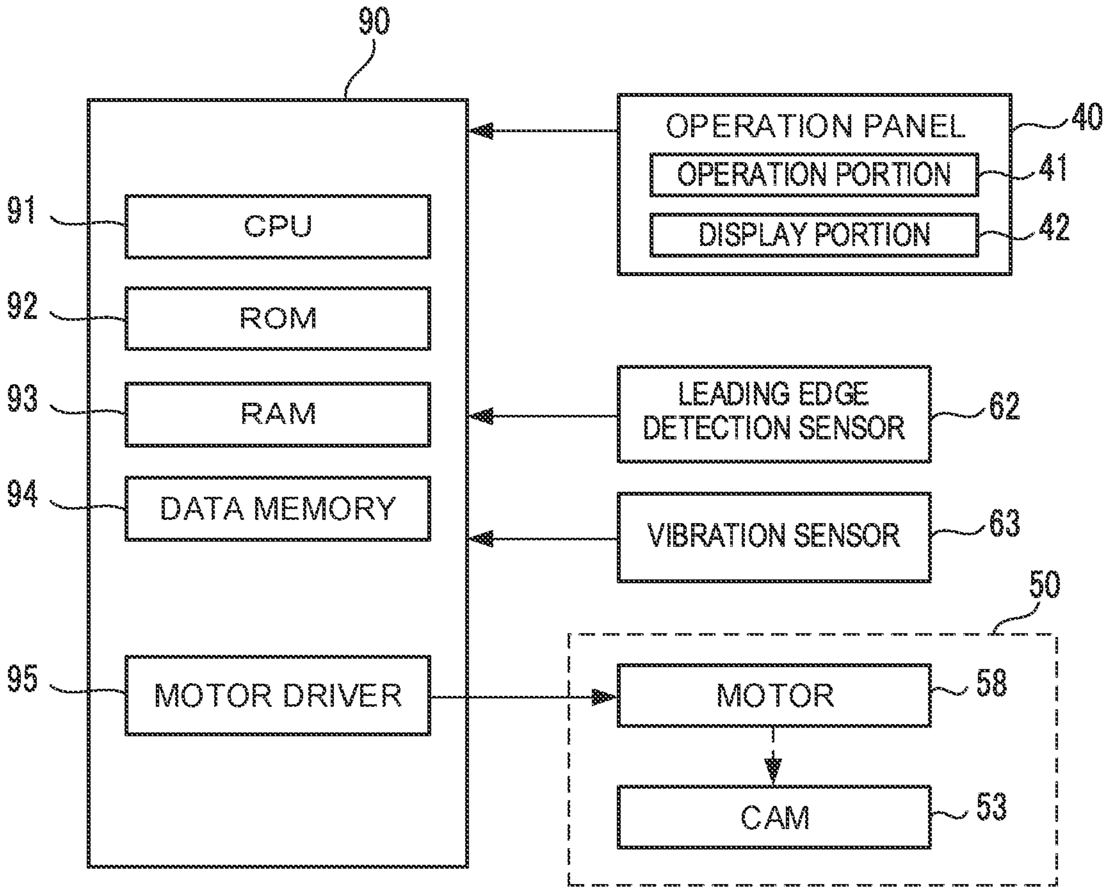
FIG. 5 is a diagram showing a configuration of a control portion of the inkjet recording apparatus.

As shown in FIG. 3, the contact pressure adjustment mechanism 50 includes a holder 51 (an example of a roller support portion according to the present disclosure) that supports the driven roller 27B, a coil spring 52 as a pressing member, a cam 53, and a motor 58 (see FIG. 5).

The driven roller 27B is provided at a position facing the drive roller 27A. The driven roller 27B is rotatably supported by the holder 51 and supported so as to be able to move in a direction toward the drive roller 27A.

The holder 51 rotatably supports the driven roller 27B. More specifically, the holder 51 has an accommodating portion 511 that accommodates the driven roller 27B. A rotating shaft 27B1 is fixedly supported by the accommodating portion 511. The driven roller 27B is rotatably supported by the rotating shaft 2761. In other words, the driven roller 27B is rotatably supported by the holder 51 via the rotating shaft 2761.

In addition, the holder 51 is configured to support the driven roller 27B so that the driven roller 27B is able to displace in the direction in which the driven roller 27B faces the driving roller 27A.

The holder 51 has an arm 512 extending from the accommodating portion 511. The arm 512 extends toward the downstream side in the conveying direction from the conveying roller pair 27. A pivot shaft 513 is integrally formed at the tip-end portion of the arm 512. That is, the pivot shaft 513 is located farther on the downstream side in the sheet conveying direction than the driven roller 27B.

The pivot shaft 513 is inserted through a shaft hole (not shown) provided in an inner frame (not shown) of the housing 11 (see FIG. 1). Thus, the holder 51 is supported so as to be able to pivot around the pivot shaft 513.

Since the holder 51 is configured in this manner, the holder 51 is pivotally supported between a contact position (position shown in FIG. 3) where the driven roller 27B is able to come in contact with the outer peripheral surface (roller surface) of the drive roller 27A to form the nip portion 20, and a separated position where the driven roller 27B is separated from the outer peripheral surface (roller surface) of the drive roller 27A.

The coil spring 52 applies a pressing force to the holder 51, where one end of the coil spring 52 is attached to a spring receiving portion 514 provided in the accommodating portion 511 of the holder 51, and the other end is attached to a support member 55 movably supported by an inner frame of the housing 11.

The support member 55 has a protrusion 551 that supports the other end of the coil spring 52. The protrusion 551 supports the other end of the coil spring 52. In this embodiment, the coil spring 52 is used as a so-called compression spring. Therefore, the coil spring 52 is held between the protrusion 551 and the spring receiving portion 514 in a state of being compressed from the natural length. Thus, the coil spring 52 presses the holder 51 with a predetermined pressing force. In addition, the holder 51 is pressed from the separated position toward the contact position by receiving this pressing force. Thus, the holder 51 is always placed at the contact position, and the driven roller 27B maintains a state of contact with the outer peripheral surface (roller surface) of the drive roller 27A with a predetermined pressing force.

Note that instead of the coil spring 52, various types of pressing members that can elastically press the holder 51 from the separated position toward the contact position may be applied.

The cam 53 is an eccentric cam attached to an output shaft 581 of the motor 58 (see FIG. 5) as a drive portion. The cam 53 is provided with an outer peripheral surface thereof in contact with the support member 55. The cam 53, by rotating as the motor 58 rotates, causes the support member 55 to displace. More specifically, the cam 53 causes the support member 55 to displace in a direction (left-right direction in FIG. 2) in which the coil spring 52 is contracted or expanded while maintaining the compressed state of the coil spring 52.

The support member 55, by being displaced by the cam 53, is able to move between a first position (position shown in FIG. 3) and a second position (position shown in FIG. 4). Note that, in FIG. 4, the support member 55 arranged at the first position is indicated by a broken line.

In a case where the support member 55 is positioned at the first position, the coil spring 52 is compressed most and a spring force thereof becomes maximum, and the contact pressure P1 of the driven roller 27B against the drive roller 27A also becomes maximum. That is, the first position is the position where the contact pressure P1 is maximum.

In a case where the support member 55 is positioned at the second position, the amount of compression of the coil spring 52 is minimum, the spring force of the coil spring 52 is minimum, and the contact pressure P1 of the driven roller 27B against the driving roller 27A is also minimum. That is, the second position is the position where the contact pressure P1 becomes minimum.

The rotation of the motor 58 is controlled by the control portion 90 (see FIG. 5), which will be described later, to control the position of the support member 55, and as a result, the contact pressure P1 at the nip portion 20 is adjusted.

[Control Portion 90]

The control portion 90, together with controlling the recording apparatus X1, adjusts the contact pressure P1. As shown in FIG. 5, the control portion 90 includes a CPU 91, a ROM 92, a RAM 93, a data memory 94, a motor driver 95, and the like. The control portion 90 is electrically connected to the operation panel 40, various sensors, various motors, and the like provided in the recording apparatus X1. FIG. 5 shows a state in which the operation panel 40, the leading edge detection sensor 62, the vibration sensor 63, and the motor 58 are connected to the control portion 90. Note that each motor, including the motor 58, is connected to a motor driver 95 of the control portion 90 and driven and controlled by receiving individual control signals from the motor driver 95.

The operation panel 40 includes an operation portion 41 for performing operations such as inputting various types of instructions to the recording apparatus X1 and inputting instructions for changing setting values, a display portion 42 for displaying various types of information and setting values, and the like.

The motor 58 is, for example, a stepping motor. The motor 58 rotates by a rotation amount corresponding to a drive signal output from the motor driver 95.

The leading edge detection sensor 62 is provided in the third conveying path 15C, and more specifically, on the upstream side of the conveying roller pair 27 in the third conveying path 15C. The leading edge detection sensor 62 is used for determining whether the sheet has entered the nip portion 20 of the conveying roller pair 27. The leading edge detection sensor 62 detects the leading edge of the sheet conveyed on the third conveying path 15C. The leading edge detection sensor 62 is, for example, a reflective optical sensor. The leading edge detection sensor 62 is connected to the control portion 90, and a detection signal from the reflective optical sensor is sent to the control portion 90. The control portion 90 detects the leading edge of the printing sheet based on a change in the detection signal sent from the reflective optical sensor. In addition, the control portion 90 determines that the leading edge of the sheet has entered the nip portion 20 when a predetermined time has elapsed since the leading edge of the sheet was detected.

The vibration sensor 63 is provided in the third conveying path 15C, and more specifically, in the vicinity of the conveying roller pair 27 in the third conveying path 15C. In this embodiment, the vibration sensor 63 is provided on the downstream side of the conveying roller pair 27 in the third conveying path 15C. The vibration sensor 63 detects vibration generated in the sheet while the sheet is passing through the nip portion 20 of the conveying roller pair 27. More specifically, the vibration sensor 63 detects vibration caused by stick-slip that occurs in the sheet when the sheet is conveyed by the conveying roller pair 27.

Figure 6:
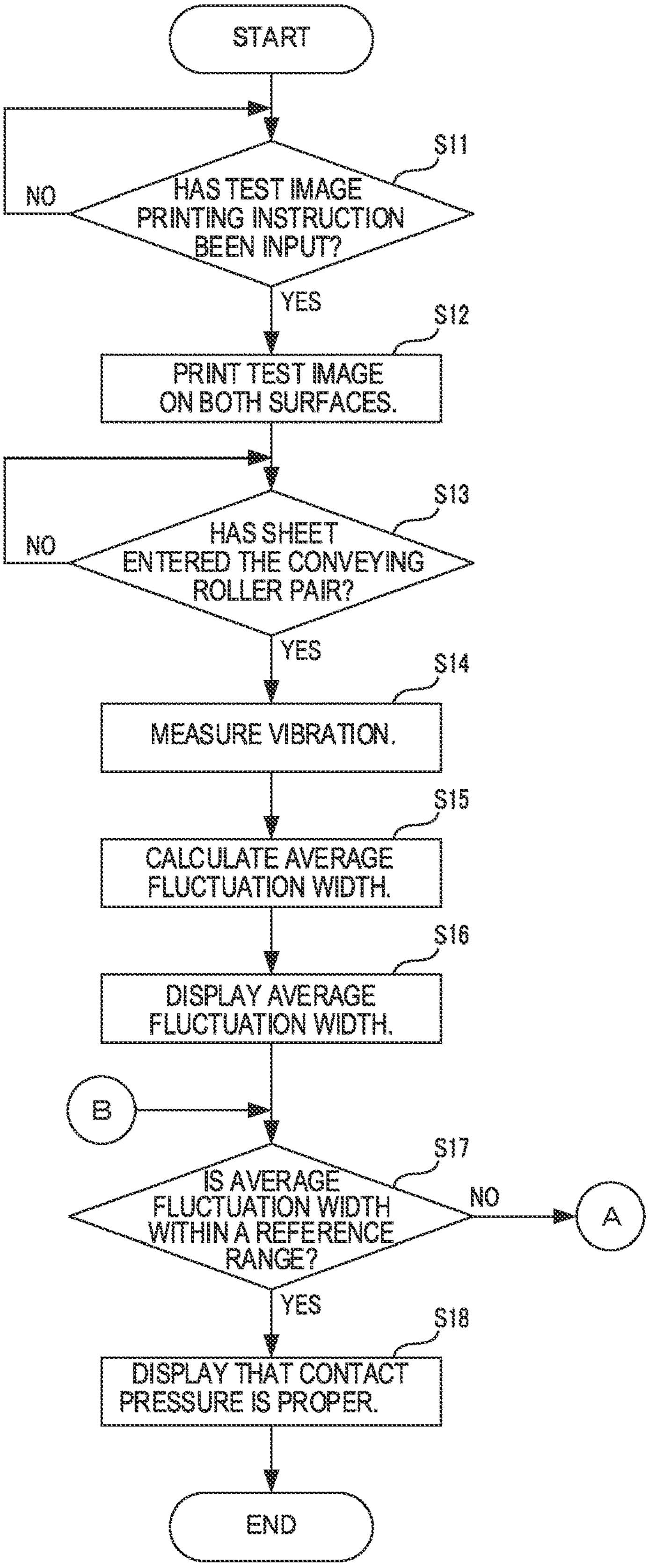
FIG. 6 is a flowchart for explaining a contact pressure adjustment method performed in the inkjet recording apparatus and a procedure of a contact pressure adjustment process executed by the control portion.
Figure 7:
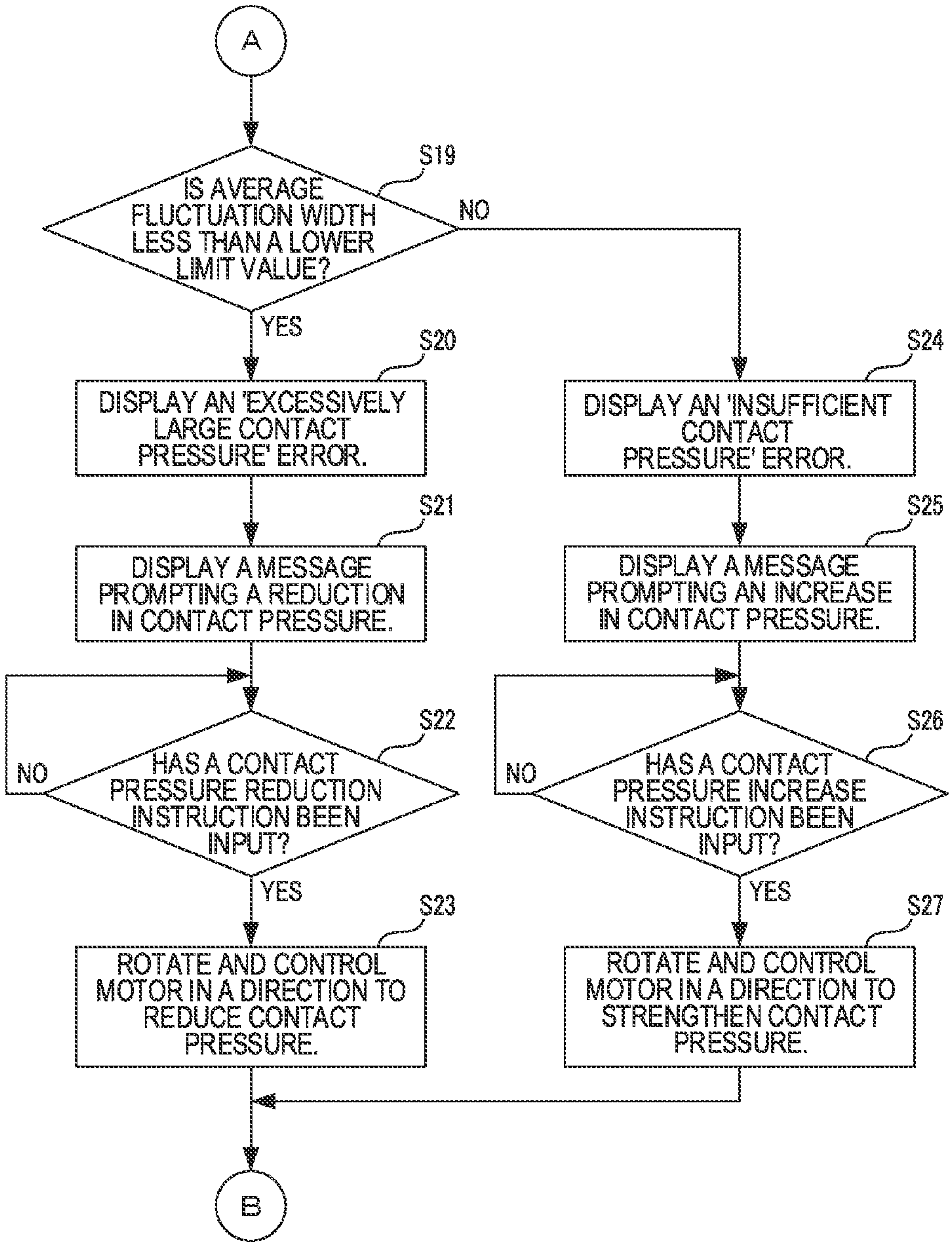
FIG. 7 is a flowchart for explaining a contact pressure adjustment method performed in the inkjet recording apparatus and a procedure of a contact pressure adjustment process executed by the control portion.

In this embodiment, the contact pressure adjustment method for adjusting the contact pressure P1 is carried out according to the procedures shown in the flowcharts of FIG. 6 and FIG. 7. Here, FIG. 6 and FIG. 7 are flowcharts for explaining the contact pressure adjustment method performed in the recording apparatus X1 and the procedure of the contact pressure adjustment process executed by the control portion 90.

Note that in the recording apparatus X1, the contact pressure P1 is set to an intermediate value between the maximum and minimum possible values of the contact pressure P1. In addition, it is assumed that the adjustment of the contact pressure P1 is performed when the operation mode of the recording apparatus X1 is the maintenance mode.

When a maintenance mode instruction signal is input to the recording apparatus X1 from the operation portion 41 of the operation panel 40 of the recording apparatus X1, the operation mode of the recording apparatus X1 shifts to the maintenance mode. In this state, when the operator inputs a test image print instruction from the operation panel (S11), the control portion 90 starts a test image recording process for recording a test image on a sheet (S12). The test image recording process is a process of recording a predetermined test image on both the front and back sides of the sheet.

That is, the control portion 90 feeds the sheet from the sheet feed cassette 1 and conveys the sheet to the recording portion 3, causes the recording portion 3 to print the test image on a first surface (front surface) of the sheet, and conveys the printed sheet to the intermediate tray 13, then switches back the sheet, conveys the sheet to the third conveying path 15C, and conveys the sheet to the recording portion 3 again. After that, the control portion 90 controls the recording portion 3 to print the test image on a second surface (back surface) of the sheet, and conveys the sheet after double-sided printing to the sheet discharge tray 17.

The test image can be arbitrarily determined, for example, a solid image using a relatively large amount of ink, a prescribed photographic image, or the like. These images consume a large amount of ink, and thus the ink dries more slowly after printing than text images. Of course, the test image is not limited to such an image, and, for example, may be an image having a density corresponding to an average density or an image having a density corresponding to the highest density among the images printed by the recording apparatus X1.

Next, in step S13, the control portion 90 determines whether or not the sheet having the image printed on the first side has entered the conveying roller pair 27 of the third conveying path 15C. After the leading edge of the sheet reaches the leading edge detection sensor 62 and the leading edge of the sheet is detected by the control portion 90, the control portion 90 counts a predetermined time required for the leading edge of the sheet to reach the conveying roller pair 27, and determines that the sheet has entered the conveying roller pair 27 when the predetermined time has elapsed.

In the next step S14, the control portion 90 detects vibration of the sheet conveyed by the conveying roller pair 27. Based on a detection value of the vibration sensor 63, the control portion 90 detects vibration caused by stick-slip occurring in the sheet.

After detecting the vibration for a predetermined period of time, the control portion 90 analyzes a waveform of the vibration and calculates an average value of a fluctuation width (average fluctuation width) of the vibration. For example, the control portion 90 continuously plots the maximum value and minimum value of the waveform in one cycle of the detected vibration over a plurality of cycles, calculates the average value of these values, and calculates the average maximum value and average minimum value as the average fluctuation width.

After calculating the average fluctuation width, the control portion 90 outputs information of a numerical value thereof to the operation panel 40 and performs an output process for displaying the average fluctuation width on the display portion 42 (S16). The control portions 90 that performs the output process in step S16 is an example of an output processing portion according to the present disclosure. Note that the control portion 90 may output the average fluctuation width not only to the display unit 42, but also, for example, to a mobile terminal (tablet terminal, notebook terminal, smartphone, or the like) used by the operator performing the adjustment work.

In the next step S17, the control portion 90 determines whether or not the average fluctuation width is within a predetermined reference range. Here, in a case where the sheet having the test image printed on the first side (front surface) is conveyed along the third conveying path 15C, the reference range is an allowable range that ensures that the sheet is stably conveyed without the ink on the sheet adhering to the roller surface of the driven roller 27B and being re-transferred to subsequent sheets, and without the driving roller 27A slipping.

A case where the average fluctuation width is smaller than a lower limit of the reference range means that a difference between the static frictional force and the dynamic frictional force when the stick-slip occurs is small. In this case, the dynamic frictional force is smaller than the static frictional force; however, since the difference between the static frictional force and the dynamic frictional force is very small, a force as strong as the static frictional force is always applied to the roller surface of the driven roller 27B. In this case, although the sheet can be reliably held and conveyed, problems may occur in that there is a high possibility that ink will adhere to the roller surface of the driven roller 27B from the ink image on the image recording surface of the sheet, and that Ink adhering to the driven roller 27B will be retransferred to subsequent sheets.

A case where the average fluctuation width is larger than an upper limit of the reference range means that the difference between the static frictional force and the dynamic frictional force when the stick-slip occurs is large. In this case, since the dynamic frictional force is much smaller than the static frictional force, the contact pressure between the roller surface of the driven roller 27B and the sheet is relatively small and smaller than the predetermined threshold in the sliding state of the stick-slip. Therefore, although ink from the ink image on the image recording surface is less likely to adhere to the roller surface of the driven roller 27B, the driven roller 27B or the drive roller 27A may slip, resulting in unstable conveyance of the sheet.

In step S17, when it is determined that the average fluctuation width is within the reference range, the control portion 90 determines that the contact pressure P1 is normal, and displays information on the display portion 42 indicating that the contact pressure P1 is normal (S18).

On the other hand, in step S17, when it is determined that the average fluctuation width is outside the reference range, the control portion 90 proceeds to step S19 in FIG. 7 and determines whether or not the average fluctuation width is smaller than the lower limit of the reference range.

When it is determined in step S19 that the average fluctuation width is smaller than the lower limit of the reference range, the control portion 90 executes processing according to the procedure from step S20. In addition, when it is determined in step S19 that the average fluctuation width is larger than the upper limit of the reference range, the control portion 90 executes processing according to the procedure from step S24.

When it is determined that the average fluctuation width is smaller than the lower limit of the reference range, the control portion 90 determines that the contact pressure P1 is excessive, and displays and outputs information on the display portion 42 indicating that the contact pressure P1 is excessive (S20).

In the next step S21, the control portion 90 displays and outputs a message on the display portion 42 prompting the user to reduce the contact pressure P1.

After confirming the message, the operator operates the operation portion 41 of the operation panel 40 to input a contact pressure reduction instruction for decreasing the contact pressure P1.

When the control portion 90 determines that the contact pressure reduction instruction has been input (YES in S22), in step S23, the control portion 90 causes the motor 58 to rotate in a direction to decrease the contact pressure P1. Thus, the cam 53 rotates by just a predetermined amount, the support member 55 is moved a predetermined amount toward a second position side (direction away from the spring receiving portion 514), and the contact pressure P1 is reduced. After that, the control portion 90 returns to step S17 and executes processing from step S17.

Note that, even though the operator does not input the contact pressure reduction instruction, in a case in which the control portion 90 determines that the average fluctuation width is smaller than the lower limit value of the reference range, the motor 58 may be automatically rotated in the direction of reducing the contact pressure P1.

When it is determined that the average fluctuation width is greater than the upper limit of the reference range, the control portion 90 determines that the contact pressure P1 is insufficient, and displays and outputs information on the display portion 42 indicating that the contact pressure P1 is insufficient. In a case where the contact pressure P1 is insufficient, the conveying roller pair 27 slips and the sheet will not be able to be conveyed stably.

Therefore, in the next step S25, the control portion 90 displays and outputs a message on the display portion 42 prompting to increase the contact pressure P1.

After confirming the message, the operator operates the operation portion 41 of the operation panel 40 to input a contact pressure increase instruction for increasing the contact pressure P1.

When the control portion 90 determines that the contact pressure increase instruction has been input (YES in S26), in step S27, the control portion 90 causes the motor 58 to rotate in a direction to increase the contact pressure P1. Thus, the cam 53 rotates by a predetermined amount, the support member 55 moves a predetermined amount toward a first position side (direction toward the spring receiving portion 514), and the contact pressure P1 increases. After that, the control portion 90 returns to step S17 and executes processing from step S17.

Note that, even though the operator does not input the contact pressure increase instruction, in a case in which the control portion 90 determines that the average fluctuation width is larger than the upper limit value of the reference range, the motor 58 may be automatically rotated in the direction to increase the contact pressure P1.

As described above, in the present embodiment, the operator causes the recording portion 3 to record the predetermined test image on the sheet, and while the recorded sheet with the test image recorded on the first surface is conveyed on the third conveying path 15C by the conveying roller pair 27, causes the vibration sensor 63 and the control portion 90 to detect the vibration generated in the recorded sheet, and determines whether or not the fluctuation width of the detected vibration is within the predetermined reference range, and in a case where the fluctuation width is outside the reference range, inputs an instruction (contact pressure reduction instruction, contact pressure increase instruction) for adjusting the contact pressure P1 from the operation panel 40, and causes the control portion 90 to adjust the contact pressure P1 against the image recording surface of the recorded sheet. By this kind of adjustment method, the contact pressure P1 is adjusted to an appropriate magnitude, and thus stable conveyance is achieved by the conveying roller pair 27, and ink is prevented from adhering to the driven roller 27B of the conveying roller pair 27.

In addition, in the recording apparatus X1 of the present embodiment, the control portion 90 detects vibration of the sheet being conveyed by the conveying roller pair 27 based on the detection value of the vibration sensor 63, calculates the fluctuation width of the detected vibration, and displays and outputs the calculated fluctuation width on the display portion 42. Therefore, the operator can easily confirm the displayed fluctuation width, and can use this as a reference for later adjustment work of the contact pressure P1.

In addition, the control portion 90 is configured to determine whether or not the fluctuation width of the detected vibration is within the predetermined reference range, and in a case where the fluctuation width is outside the reference range, is configured to drive and control the motor 58 to adjust the contact pressure P1 of the recorded sheet against the image recording surface. Therefore, it becomes possible to adjust the contact pressure P1 more easily than when an operator manually adjusts the contact pressure P1.

Figure 8:
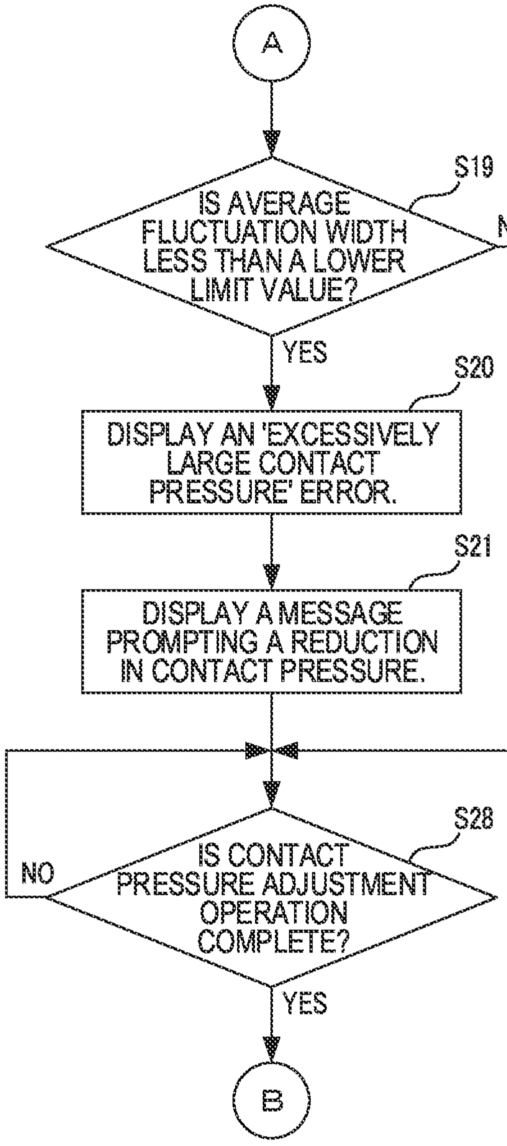
FIG. 8 is a flowchart for explaining a modification of a contact pressure adjustment method performed in the inkjet recording apparatus and a contact pressure adjustment process executed by the control portion.

Note that, in the above-described embodiment, a configuration in which the contact pressure P1 is adjusted by the control portion 90 has been described; however, the technique according to the present disclosure is not limited to this configuration. For example, without the adjustment function by the control portion 90 being installed, the recording apparatus X1 may be provided with a manual operation portion for manually rotating the cam 53 instead of the motor 58. In this case, as shown in FIG. 8, after the message is displayed in step S21 or step S25, the operator operates the manual operation portion to rotate the cam 53 to manually adjust the contact pressure P1. After that, when the operator, via the operation portion 41, inputs a signal indicating the completion of the contact pressure adjustment, the control portion 90 performs the processing from step S17. Even with such a configuration, it is possible to adjust the contact pressure P1 to an appropriate value.

In addition, in the above-described embodiment, a configuration for adjusting the contact pressure P1 by the conveying roller pair 27 was exemplified; however, for example, the contact pressure adjustment mechanism 50 may also be provided in the driven rollers of the conveying roller pairs 25, 26, 28, and 29. For example, the contact pressure adjustment mechanism 50 may also be provided in the driven roller 25B of the conveying roller pair 25 located on the most upstream side of the second conveying path 15B. Alternatively, the contact pressure adjustment mechanism 50 may also be provided in the driven roller 25B of the conveying roller pair 25 provided in a portion with a large degree of curvature (a portion with a large curvature).

Second Embodiment

Next, a second embodiment according to the present disclosure will be described with reference to FIG. 9 to FIG. 11. Note that, in the description of the present embodiment, the same reference numerals as those used for the respective configurations of the first embodiment are given to the configurations that are common to the configurations of the first embodiment described above, and detailed descriptions thereof will be omitted.

Figure 9:
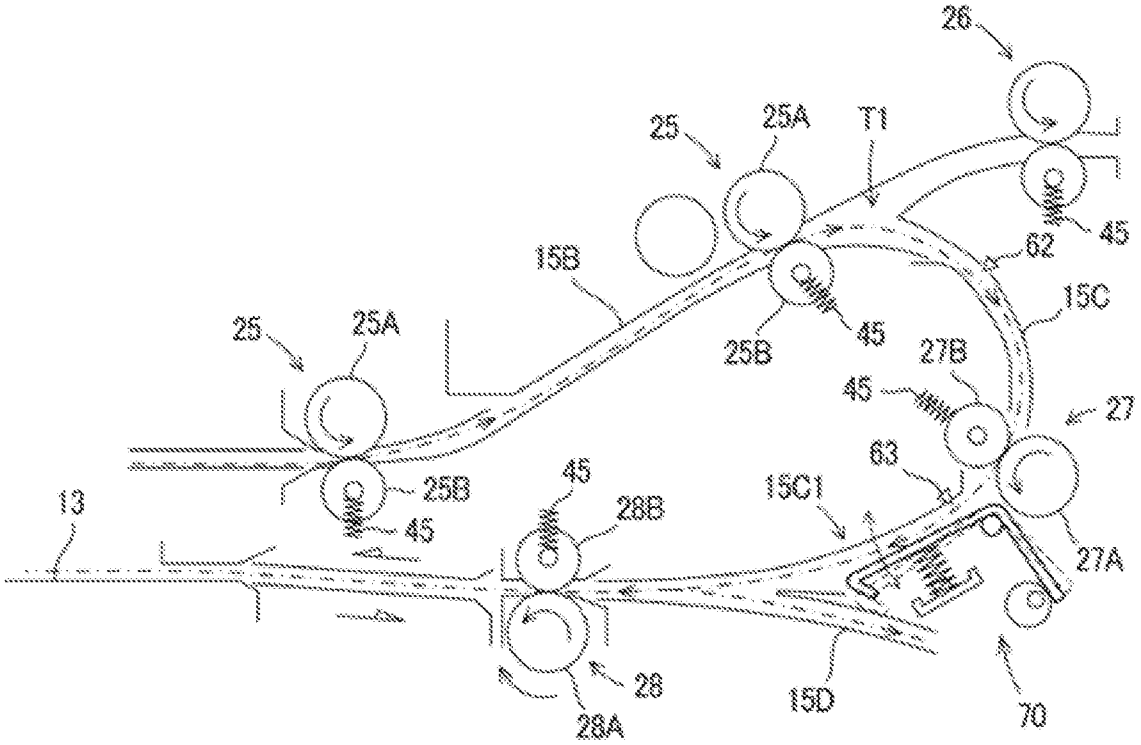
FIG. 9 is a diagram showing a third conveying path within the inkjet recording apparatus of a second embodiment according to the present disclosure.

FIG. 9 is a diagram showing the third conveying path 15C inside the recording apparatus X1 according to the present embodiment. FIG. 10 is a diagram showing a contact pressure adjustment mechanism 70 provided in the third conveying path 15C. The present embodiment differs from the above-described first embodiment in that the contact pressure adjustment mechanism 50 is not provided in the third conveying path 15C, and the contact pressure adjustment mechanism 70 (an example of the contact pressure adjustment mechanism according to the present disclosure) is provided.

The conveying roller pair 27 of the third conveying path 15C has a drive roller 27A and a driven roller 27B pressed toward the driving roller 27A by an elastic member 45 such as a coil spring. The driven roller 27B is pressed against the drive roller 27A by receiving a pressing force.

When the sheet is conveyed along the curved third conveying path 15C by the conveying roller pair 27, the sheet is bent by the curved shape of the third conveying path 15C. In this case, the sheet is pressed toward the driven roller 27B side. Thus, the driven roller 27B applies contact pressure P2, which is a combination of the pressing force of the elastic member 45 such as a coil spring and the pressing force pressed against driven roller 27B from the sheet, to the sheet. The contact pressure adjustment mechanism 70 is configured to be able to adjust the contact pressure P2 applied from the driven roller 27B to the sheet conveyed over the third conveying path 15C at the nip portion 20.

Figure 10:
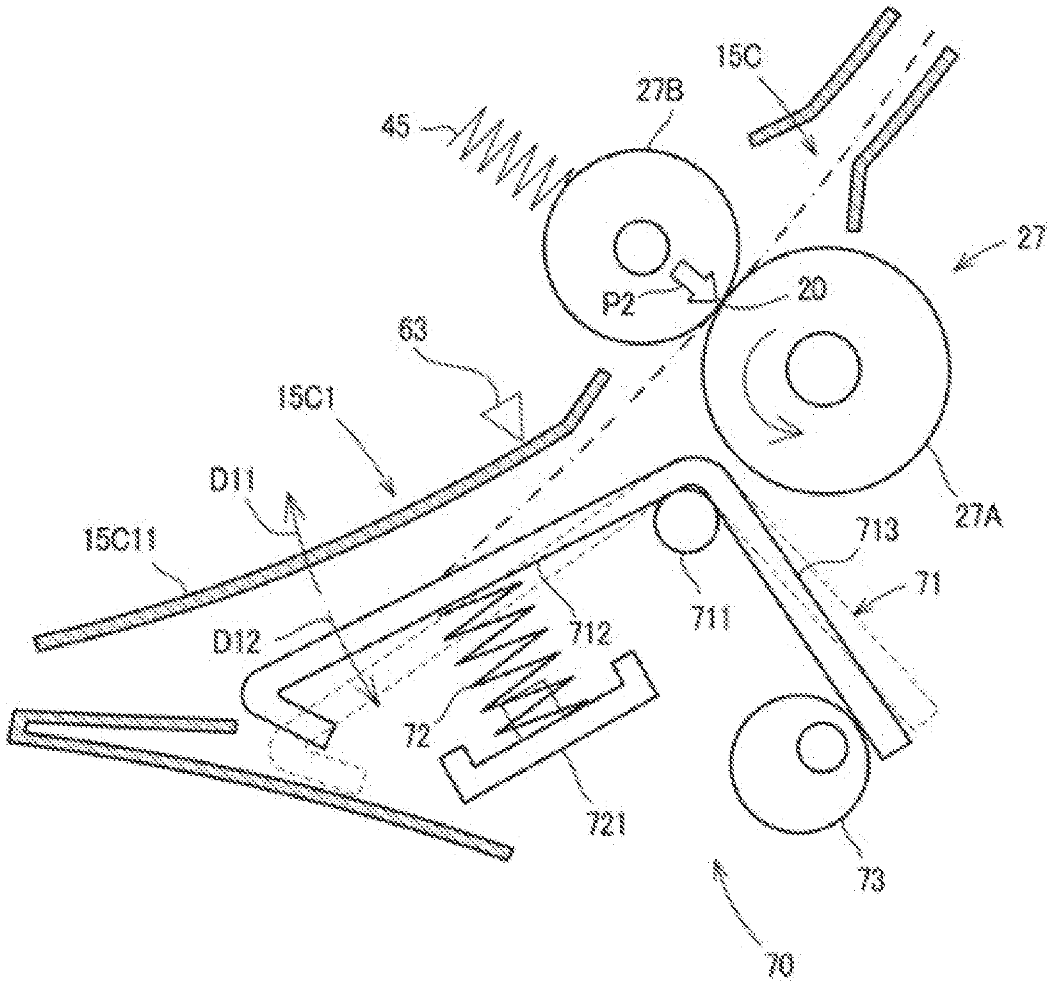
FIG. 10 is a diagram showing a contact pressure adjustment mechanism provided in the third conveying path.

As shown in FIG. 10, the contact pressure adjustment mechanism 70 includes a guide member 71 (an example of a movable guide portion according to the present disclosure), a coil spring 72 as a pressing member, a cam 73, and a motor (not shown) as a drive portion. The motor has the same configuration as the motor 58 of the first embodiment described above, and is rotationally driven by the control portion 90.

The guide member 71 is provided farther on the downstream side than the conveying roller pair 27. A conveying path 15C1 farther on the downstream side than the conveying roller pair 27 is formed by an upper guide 15C11 and a guide member 71 fixed to the inner frame of the housing 11 (see FIG. 1).

The guide member 71 has a pivot shaft 711 provided near the drive roller 27A, and a lower guide 712 arranged at a position facing the upper guide 15C11.

The pivot shaft 711 is inserted through a shaft hole (not shown) provided in an inner frame (not shown) of the housing 11 (see FIG. 1). Thus, the guide member 71 is supported so as to be able to pivot around the pivot shaft 711.

Since the guide member 71 is configured in this manner, the guide member 71 is pivotally supported between a narrow position where the width of the conveying path 15C1 is narrowest (position indicated by the solid line in FIG. 10) and an expanded position where the width of the conveying path 15C1 is maximized (position indicated by the dashed line in FIG. 10). The curvature of the conveying path 15C1 is changed by the guide member 71 pivoting between the narrow position and the expanded position.

The coil spring 72 applies a pressing force to the guide member 71 in a direction D11 that narrows the width of the conveying path 15C1. One end of the coil spring 72 is attached to the lower guide 712 and the other end is attached to a spring seat 721 provided on the housing 11.

The coil spring 72 is used as a so-called compression spring. Therefore, the coil spring 72 is held between the lower guide 712 and the spring seat 721 while in a state of being compressed from a natural length thereof. Thus, the coil spring 72 presses the lower guide 712 of the guide member 71 in the direction D11 with a predetermined pressing force.

Note that in place of the coil spring 72, various types of pressing members that can elastically press the lower guide 712 in the direction D11 can be applied.

The guide member 71 has a contact arm 713 against which the cam 73 is pressed. The contact arm 713 extends from the pivot shaft 711 in a direction away from the conveying path 15C1.

The cam 73 is an eccentric cam attached to the output shaft of the motor as a drive portion. The cam 73 is provided in a state in which an outer peripheral surface thereof is in contact with the contact arm 713. The cam 73, by coming in contact with the contact arm 713, restricts the swinging motion of the guide member 71 due to the pressing force of the coil spring 72. In other words, the cam 73 functions as a stopper that prevents the guide member 71 from pivoting.

The cam 73, rotating with the rotation of the motor, causes the guide member 71 to displace between the narrow position and the expanded position.

In a case where the guide member 71 is positioned at the narrow position, the coil spring 52 is extended the most, and the conveying width of the conveying path 15C1 becomes the narrowest.

In a case where the guide member 71 is positioned at the expanded position, the coil spring 52 is compressed the most and the conveying width of the conveying path 15C1 becomes the widest.

In the state where the conveying path 15C1 is narrowed and in a state where the conveying path 15C1 is widened, the position (contact position) where the leading edge of the sheet that has passed through the nip portion 20 of the pair of conveying rollers 27 contacts the lower guide 712 is different. More specifically, in a case where the conveying path 15C1 is wide, the contact position is shifted toward the downstream side in the conveying direction compared to when the conveying path 15C1 is narrow. Therefore, the curvature of the conveying path 15C1 is reduced by widening the conveying path 15C1. Thus, the amount of bending of the sheet is suppressed, and the pressing force with which the sheet is pressed toward the driven roller 27B side is reduced. As a result, the contact pressure P2 becomes smaller. Conversely, when the conveying path 15C1 is narrowed, the curvature of the conveying path 15C1 increases, the bending amount of the sheet increases, and the pressing force with which the sheet is pressed toward the driven roller 27B side increases. As a result, the contact pressure P2 increases.

In the present embodiment, the guide member 71 is displaced between the narrow position and the expanded position by controlling the rotation of the motor by the control portion 90 (see FIG. 5). Thus, the width of the conveying path 15C1 is changed, and as a result, the contact pressure P1 is adjusted.

Figure 11:
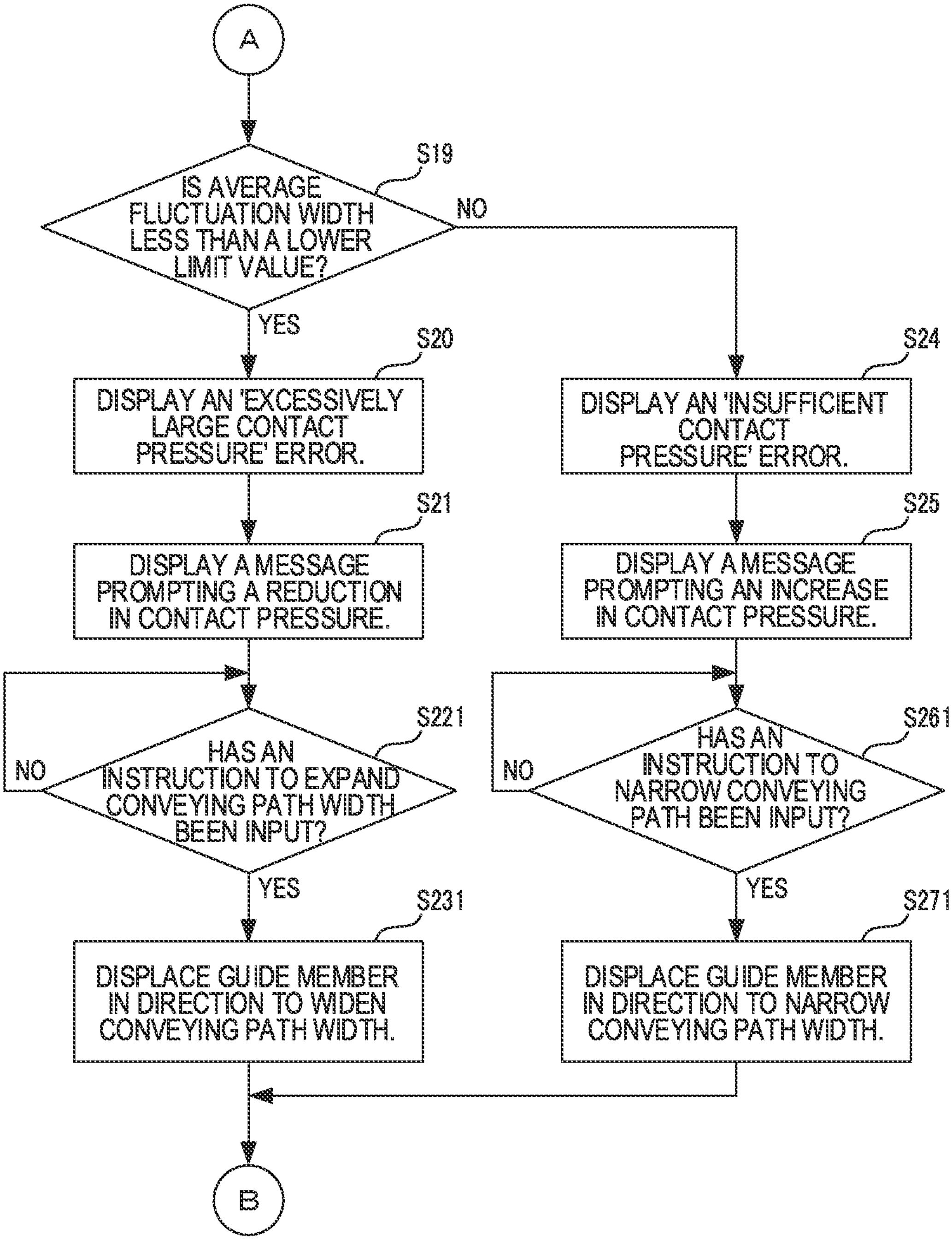
FIG. 11 is a flowchart for explaining a contact pressure adjustment method performed in the inkjet recording apparatus of the second embodiment according to the present disclosure and a procedure of a contact pressure adjustment process executed by the control portion.

FIG. 11 is a flowchart for explaining the contact pressure adjustment method performed in the recording apparatus X1 and the contact pressure adjustment process executed by the control portion 90.

Note that in the recording apparatus X1, the initial position of the guide member 71 is an intermediate position between the narrow position and the expanded position. In addition, it is assumed that the adjustment of the contact pressure P2 is performed when the operation mode of the recording apparatus X1 is the maintenance mode.

In step S21 described above, when the control portion 90 displays and outputs a message prompting to reduce the contact pressure P2, the operator who confirms the message, operates the operation portion 41 of the operation panel 40 to input a conveying width expansion instruction for expanding the conveying width of the conveying path 15C1.

When the control portion 90 determines that the conveying width expansion instruction has been input (YES in S221), in step S231, the control portion 90 causes the motor to rotate so that the guide member 71 displaces in the direction D12 (width expansion direction) for expanding the conveying width of the conveying path 15C1. Thus, the cam 73 rotates by a predetermined amount, the guide member 71 pivots in the direction D12 by a predetermined amount, and the contact pressure P2 becomes smaller. After that, the control portion 90 returns to step S17 and executes processing from step S17.

In step S25 described above, when the control portion 90 displays and outputs a message prompting to increase the contact pressure P2, the operator, who confirms the message, operates the operation portion 41 of the operation panel 40 to input a conveying width narrowing instruction for narrowing the conveying width of the conveying path 15C1.

When the control portion 90 determines that the conveying width narrowing instruction has been input (YES in S261), in step S271, the control portion 90 causes the motor to rotate so that the guide member 71 displaces in the direction D11 for narrowing the conveying width of the conveying path 15C1. Thus, the cam 73 rotates by a predetermined amount, the guide member 71 pivots in the direction D11 by a predetermined amount, and the contact pressure P2 increases. After that, the control portion 90 returns to step S17 and executes processing from step S17.

As described above, in the present embodiment, the operator causes the recording portion 3 to record the predetermined test image on the sheet, and while the recorded sheet with the test image recorded on the first surface is conveyed on the third conveying path 15C by the conveying roller pair 27, causes the vibration sensor 63 and the control portion 90 to detect the vibration generated in the recorded sheet, and determines whether or not the fluctuation width of the detected vibration is within the predetermined reference range, and in a case where the fluctuation width is outside the reference range, inputs an instruction (conveying width expansion instruction, conveying width narrowing instruction) for adjusting the conveying width of the conveying path 15C1 from the operation panel 40, and causes the control portion 90 to adjust the contact pressure P2 of the recorded sheet against the image recording surface. By this kind of adjustment method, the contact pressure P2 is adjusted to an appropriate magnitude, and thus stable conveyance is achieved by the conveying roller pair 27, and ink is prevented from adhering to the driven roller 27B of the conveying roller pair 27.

In addition, the control portion 90 is configured to determine whether or not the fluctuation width of the detected vibration is within the predetermined reference range, and in a case where the fluctuation width is outside the reference range, by driving and controlling the motor to change the conveying width of the conveying path 15C1, changes the curvature of the conveying path 15C1 and adjusts the contact pressure P2 against the image recording surface of the printed sheet. Therefore, it becomes possible to adjust the contact pressure P2 more easily than in a case where an operator manually adjusts the contact pressure P2.

Note that in the above-described embodiment, a configuration in which the contact pressure P2 is adjusted by the control portion 90 has been described; however, the technique according to present disclosure is not limited to this configuration. For example, without the adjustment function by the control portion 90 being installed, the recording apparatus X1 may be provided with a manual operation portion for manually rotating the cam 73 instead of the motor. In this case, after the message is displayed in step S21 or step S25, the operator operates the manual operation portion to rotate the cam 73 to manually adjust the contact pressure P2. After that, when the operator, via the operation portion 41, inputs a signal indicating the completion of the contact pressure adjustment, the control portion 90 performs the processing from step S17. Even with such a configuration, it is possible to adjust the contact pressure P2 to an appropriate value.

In addition, in the above-described embodiment, a configuration for adjusting the contact pressure P2 by the conveying roller pair 27 was exemplified; however, for example, the contact pressure adjustment mechanism 70 may also be provided in the driven rollers of the conveying roller pairs 25, 26, 28, and 29.

Other Embodiments

Note that in each of the above-described embodiments, an example in which one of either the contact pressure adjustment mechanism 50 or the contact pressure adjustment mechanism 70 applied to the conveying roller pair 27 is provided in the third conveying path 15C has been described; however, for example, both the contact pressure adjustment mechanism 50 and the contact pressure adjustment mechanism 70 may be provided in the third conveying path 15C.

In addition, in each of the above-described embodiments, an example of determining whether or not the average fluctuation width is within the reference range when a recorded sheet having the test image recorded on the first side thereof is conveyed along the third conveying path 15C by the pair of conveying rollers 27 in the maintenance mode has been described; however, the present disclosure is not limited to this example. For example, in a normal print mode, in a case where a double-sided print job or a double-sided print instruction for printing an image evaluated to use a large amount of ink during image recording on the first side of a sheet is input, the vibration of the printed sheet conveyed by the conveying roller pair 27 on the third conveying path 15C may be detected to determine whether the average fluctuation width is within the reference range.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A contact pressure adjustment method applied to an image recording apparatus that records an image on a sheet,
 the image recording apparatus comprising:
 an image recording portion;
 a drive roller configured to convey the sheet along a predetermined conveying path by coming in contact with the sheet on which an image is recorded by the image recording portion and applying a conveying force to the sheet;
 a driven roller arranged at a position facing the drive roller and configured to be driven and rotated in contact with the image recording surface of the sheet with a predetermined contact pressure; and
 a vibration detection portion configured to detect vibration generated in the sheet conveyed on the conveying path;
 the contact pressure adjustment method comprising:
 causing the image recording portion to record a predetermined test image on the sheet;
 causing the vibration detection portion to detect vibration generated in a test-image-recorded-sheet on which the test image is recorded while the test-image-recorded-sheet is being conveyed along the conveying path; and
 adjusting the contact pressure with respect to the image recording surface of the test-image-recorded-sheet in a case where a fluctuation width of the vibration detected by the vibration detection portion is outside a predetermined reference range.

2. The contact pressure adjustment method according to claim 1, wherein
 the image recording apparatus further comprises
 a roller support portion configured to support the driven roller so as to be relatively displaceable in a direction toward the drive roller; and
 in a case where the fluctuation width of the vibration detected by the vibration detection portion is outside a predetermined reference range, the contact pressure adjustment method adjusts the contact pressure by causing the roller support portion to displace.

3. The contact pressure adjustment method according to claim 1, wherein
 the conveying path is a curved conveying path formed in a curved shape;
 the image recording apparatus further comprises
 a movable guide portion provided on the curved conveying path on a downstream side of the drive roller in the conveying direction, and is supported so as to be displaceable in a width expanding direction to widen the conveying width of the curved conveying path; and
 in a case where the fluctuation width of the vibration detected by the vibration detection portion is outside a predetermined reference range, the contact pressure adjustment method adjusts the contact pressure by changing the curvature of the curved conveying path by causing the movable guide portion to displace in the width expanding direction.

4. The contact pressure adjustment method according to claim 1, wherein
 the image recording portion records an image on the sheet based on an inkjet recording method.

5. An image recording apparatus, comprising:
 an image recording portion configured to record an image on a sheet;
 a drive roller configured to convey an image recorded sheet on which an image has been recorded by the image recording portion along a predetermined conveying path by coming in contact with and applying a conveying force to the image recorded sheet;
 a driven roller arranged at a position facing the drive roller and configured to be driven and rotated in contact with an image recording surface of the image recorded sheet with a predetermined contact pressure;
 a vibration detection portion configured to detect vibration generated in the image recorded sheet conveyed along the conveying path; and
 an output processing portion configured to output a fluctuation width of the vibration detected by the vibration detection portion.

6. The image recording apparatus according to claim 5, further comprising
 a display portion; wherein
 the output processing portion displays the fluctuation width of the vibration detected by the vibration detection portion on the display portion.

7. The image recording apparatus according to claim 5, further comprising
 a contact pressure adjustment portion capable of adjusting the contact pressure of the image recorded sheet against the image recording surface in a case where the fluctuation width of the vibration detected by the vibration detection portion is outside of a predetermined reference range.

8. The image recording apparatus according to claim 7, wherein
 the contact pressure adjustment portion includes
 a roller support portion configured to support the driven roller to be relatively displaceable in a direction toward the drive roller; and
 a drive portion configured to apply a drive force to the roller support portion; and
 the image recording apparatus further comprises a control portion configured to determine whether or not the fluctuation width of the vibration detected by the vibration detection portion is outside a predetermined reference range, and, in a case where the fluctuation width is outside the reference range, to control the drive portion to cause the roller support portion to displace.

9. The image recording apparatus according to claim 7, wherein the conveying path is a curved conveying path formed in a curved shape;

the contact pressure adjustment portion includes a movable guide portion provided on the curved conveying path on a downstream side of the drive roller in the conveying direction, and is supported so as to be displaceable in a width expanding direction to widen the conveying width of the curved conveying path; and a drive portion configured to apply a drive force to the movable guide portion;

the image recording apparatus further comprising a control portion configured to determine whether or not the fluctuation width of the vibration detected by the vibration detection portion is outside a predetermined reference range, and, in a case where the fluctuation width is outside the reference range, to control the drive portion to cause the movable guide portion to displace in the width expansion direction so as to change a curvature of the curved conveying path.

10. The image recording apparatus according to claim 5, wherein the image recording portion records an image on the sheet based on an inkjet recording method.

* * * * *